Patented Jan. 5, 1932

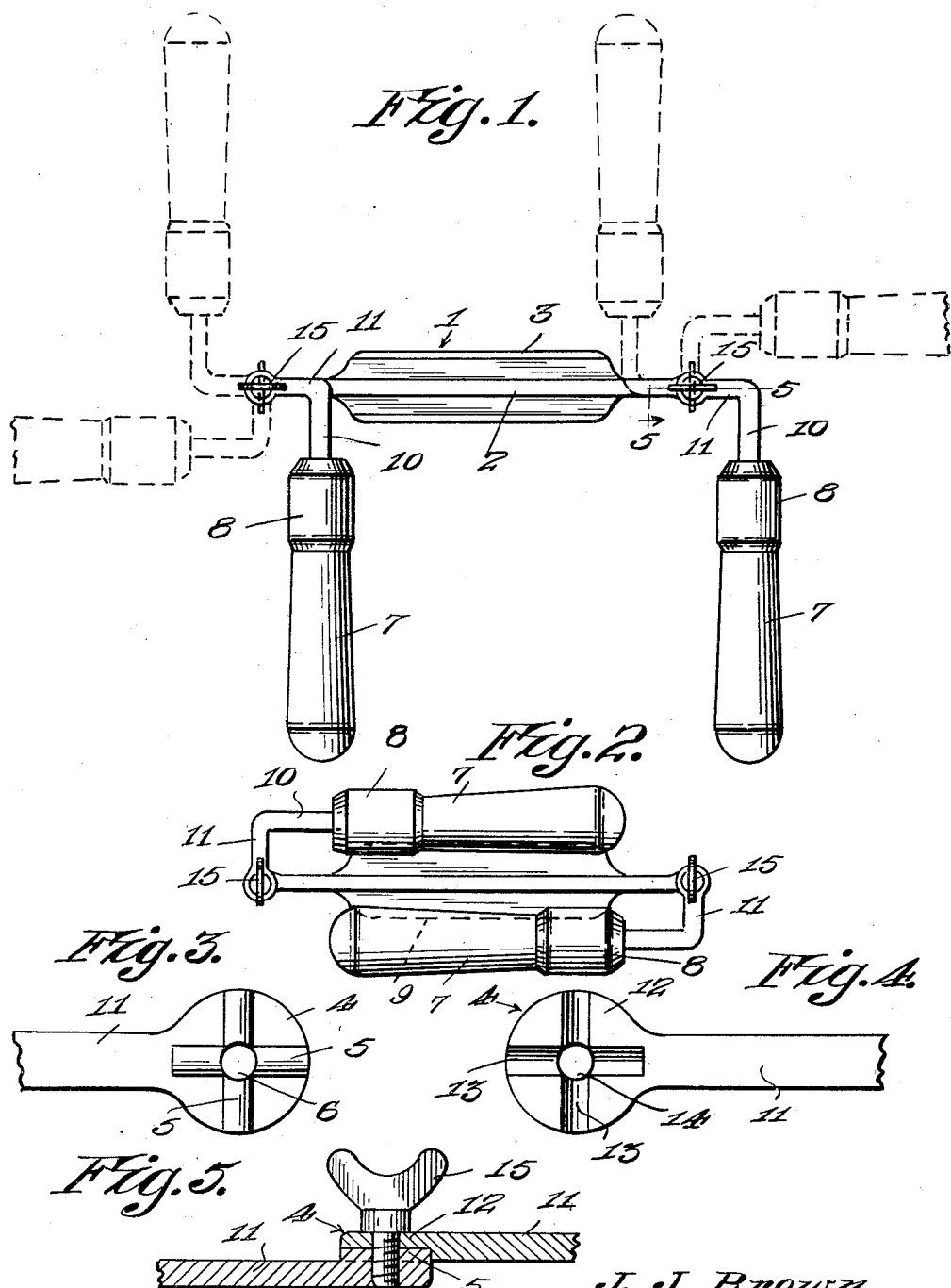

1,840,151

UNITED STATES PATENT OFFICE

JOHN JAMES BROWN, OF NASHVILLE, TENNESSEE

DRAWKNIFE

Application filed March 20, 1931. Serial No. 524,136.

My present invention has reference to a carpenter or woodworker's tool and is in the nature of a draw knife.

My primary object is to construct a draw knife with a double cutting edge and with handle members that are connected to the ends of the knife in such manner as to firmly and positively hold the handles at right angles in either direction with respect to the knife, in a plane longitudinal with respect to that of the knife and to permit of the handles being folded against the knife and to receive the cutting edges of the knife therein, thereby producing a small package which may be readily stored in the tool box of the workman or carried in his pocket.

A further object is the construction and arrangement of a draw knife and the handles thereof in such manner that the workman can operate the knife in an easier and consequently a better manner than is ordinary inasmuch as one of the handles is arranged in close proximity to the end of the knife and the other handle a distance away from the second end of the knife.

To the attainment of the foregoing the invention consists in the improvement hereinafter described and definitely claimed.

In the drawings:

Figure 1 is a plan view of a draw knife in accordance with this invention, the dotted lines showing the different positions of the handles with respect to the knife when the tool is operated.

Figure 2 is a plan view showing the cutting edges of the knife received in the grooves or pockets in the handles when the device is folded.

Figure 3 is a plan view of the headed end of the shank or rib on one end of the cutting blade or knife.

Figure 4 is a similar view of one end of the angle shank extension on one of the handles.

Figure 5 is a sectional view approximately on the line 5—5 of Figure 1.

The knife 1 of the improvement includes a central thickened portion which, for the purpose of this description, will be referred to as a rib and which is indicated by the numeral 2. From the rib there is extended the oppositely directed blade 3 of the knife proper. It is to be noted that the knife is provided with two cutting blades, and also that the rib 2 extends a suitable distance beyond the ends of the blades. The extensions of the rib are of the same length and the said extensions, at the outer ends thereof are rounded to provide what may be termed heads 4 whose flat inner faces are formed with rightangularly extending outwardly projected cross sectionally rounded lugs 5. The lugs, at the crossing points thereof are divided by a round opening 6 that is arranged in each of the heads 4.

The handles 7 are similarly shaped and each comprises a wooden member that has its outer end, however, reinforced by a metal ferrule 8. The handles 7 and the ferrules therefor have one of their faces provided with longitudinal grooves 9, the grooves being of a width to receive the cutting edges of the knife therein when the handles are folded against the blade as disclosed by Figure 2 of the drawings.

The handles have embedded therein metal shanks which extend centrally through the ferrules 8 for a suitable distance. These extensions are indicated in the drawings by the numeral 10, the said extensions merging into right angular end portions 11, and the outer ends of the said portions 11 are rounded, as at 12, to provide what I will term heads, and the said heads are formed with crossing longitudinal and transverse rightangularly arranged grooves 13 to receive the lugs 5 of the rib 2 therein. The grooves or depressions 13 are centrally intersected by a round opening 14 to aline with the openings 6 in the heads 4. The openings 6 in the heads 4 are threaded and the heads 4 underlie the heads 12 on the rightangular shanks for the handles. There is passed through the opening 14 and threaded in the opening 6 the shanks of wing bolts 15, whereby the lugs 5 are received in the grooves 13 and effectively held in binding engagement with the walls provided by such grooves.

By reference to the drawings it will be seen that the handles are arranged so that the angle extensions 11 of the shanks 10 are disposed in the same direction and consequently when the handles are positioned, as disclosed by the full lines in Figure 1 of the drawings one of the handles will be arranged in close proximity to the ends or cutting blades of the knife 1 and the other handle is arranged a considerable distance away from the second end of the knife. This is one of the important features of the invention, as by arranging one of the handles in a line with the knife the knife can be operated in a better manner than were both of the handles arranged a distance away from the ends of the knife. Also the ferrule in one of the handles may serve as a guide in the cutting operation, especially when a rectangular piece of wood has one of its corners cut away by the knife, it being, of course, necessary to hold the knife at an angle so that the ferrule of the knife closest to the blade may be drawn along the corner edge of the rectangular piece of lumber opposite that on which the knife operates. The handles may be arranged outwardly and longitudinally with respect to the knife as disclosed by the dotted lines in Figure 1 of the drawings. When in this position it will be seen that the handles are out of alinement with each other so that a more determined pull can be exerted upon one of the handles than on the other handle, which also facilitates the cutting operation. When the tool is folded the edges of the draw knife are receive in the depressions or pockets 9 in the handles as previously stated. When the handles are in any of their mentioned positions they are firmly locked to the central portion or rib of the draw knife as the divided lugs 5, arranged at right angles to each other and wholly received in the grooves 13, afford a positive locking engagement between these parts when the thumb screws are screwed home.

It is thought the foregoing description when read in connection with the accompanying drawings will fully and clearly set forth the advantages of the invention to those skilled in the art to which the invention relates so that further detailed description will not be required, but obviously I do not wish to be retricted to the precise details herein set forth and, therefore, hold myself entitled to make such changes therefrom as fairly fall within the scope of what I claim.

Having described the invention, I claim:

A draw knife including a rib having blades extending from the opposite sides thereof and the ends of the rib being rounded to provide heads that have one of their faces formed with rightangularly arranged cross sectionally rounded lugs and with an opening that passes centrally through the lugs, handles, rightangular shanks extending from the handles, and having their outer arms merging into rounded heads provided with rightangular grooves and having a central opening which intersects the grooves, the said grooves designed to receive the shanks of the ribs therein and wing bolts having their shanks threaded through the alining openings in the heads.

In testimony whereof I affix my signature.
JOHN JAMES BROWN.